UNITED STATES PATENT OFFICE.

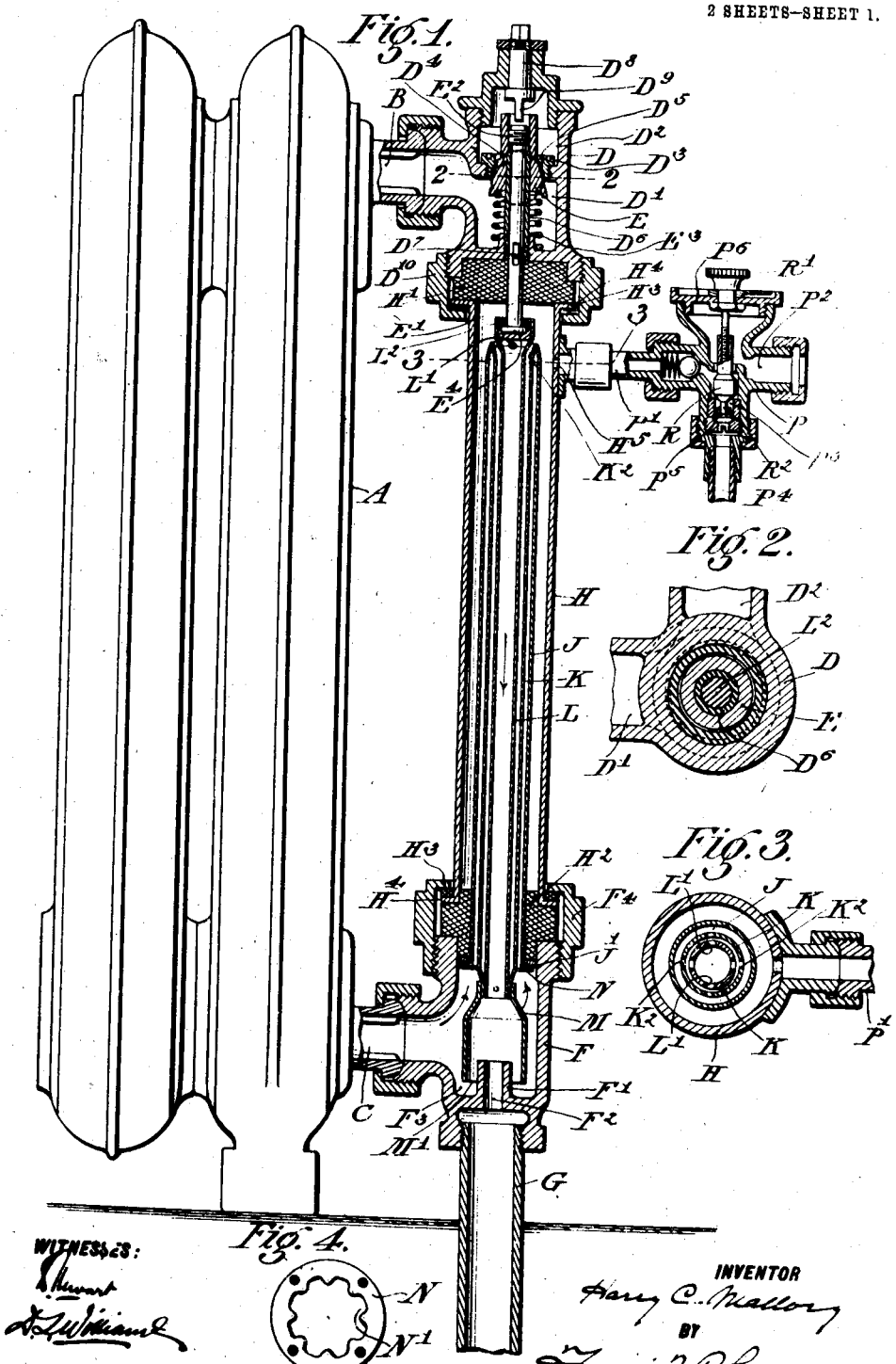

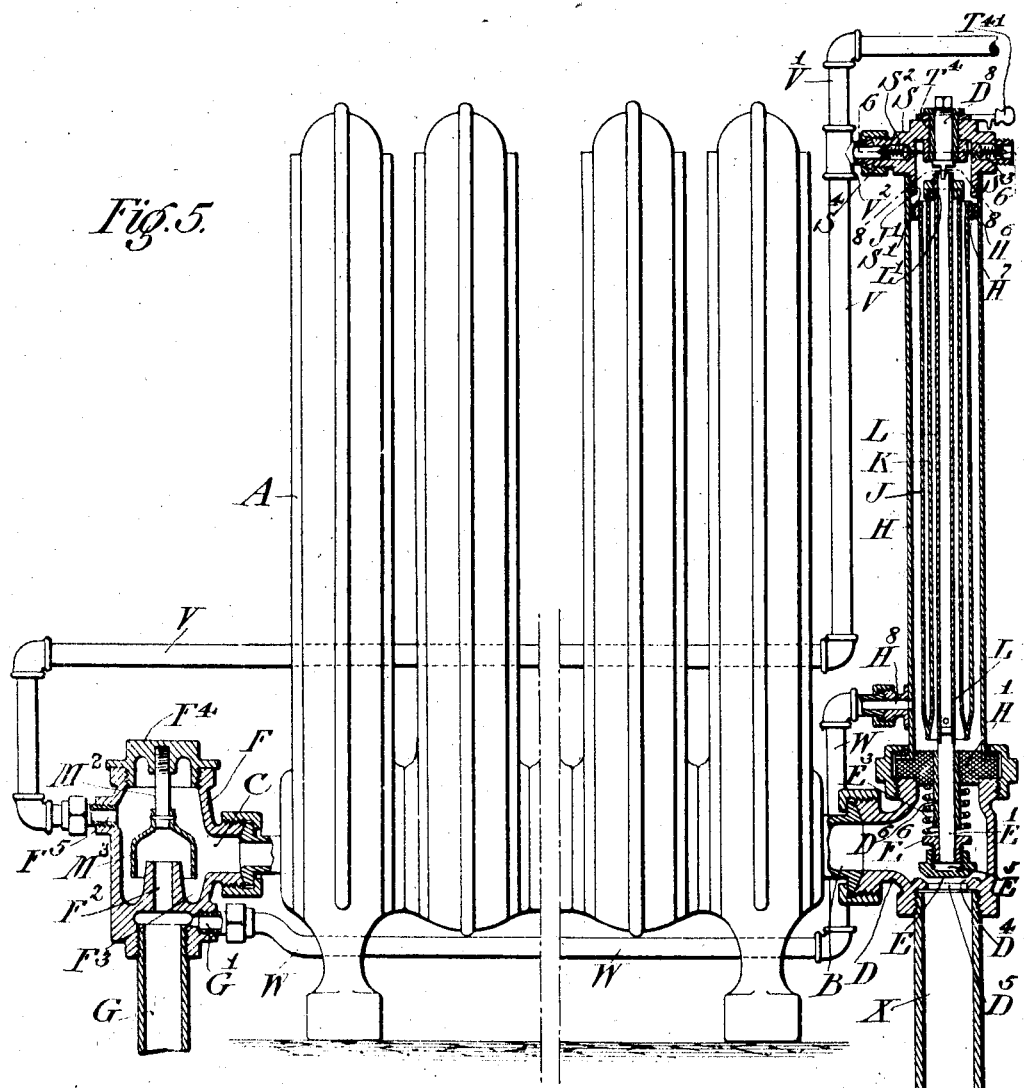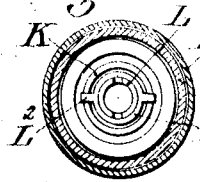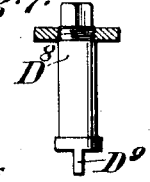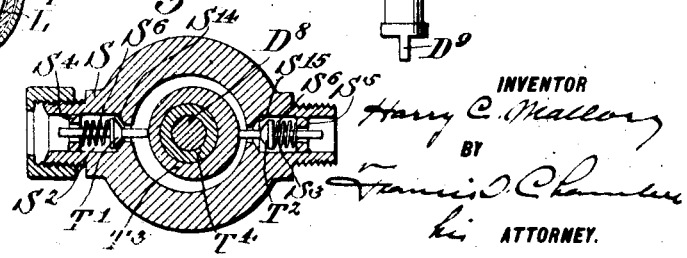

HARRY C. MALLORY, OF NEW YORK, N. Y.

STEAM-HEATING APPARATUS.

1,098,815.

Specification of Letters Patent.

Patented June 2, 1914.

Application filed August 7, 1908, Serial No. 447,372. Renewed November 1, 1913. Serial No. 798,766.

*To all whom it may concern:*

Be it known that I, HARRY C. MALLORY, a citizen of the United States of America, residing in the city, county, and State of New York, have invented a certain new and useful Improvement in Steam-Heating Apparatus, of which the following is a true and exact description, reference being had to the accompanying drawings, which form a part thereof.

My present invention relates to steam heating apparatus in which thermostatic mechanism is provided for regulating the flow of steam through the radiators or other heating devices of the system, and particularly to such apparatus in which the thermostatic mechanism is so arranged that while operating normally as a temperature regulating mechanism, it also operates as a thermostatic steam trap to prevent the useless escape of steam from the radiator.

The object of the invention is to provide a novel thermostatic mechanism of the kind described having excellent mechanical and operating properties.

The various features of novelty which characterize my invention are pointed out with particularity in claims annexed to and forming a part of this specification, but for a better understanding of the invention, however, and of the advantages possessed by it, reference may be had to the accompanying drawings and descriptive matter in which I have illustrated and described various forms in which my invention may be embodied.

Of the drawings: Figure 1 is an elevation of a portion of a steam radiator equipped with one form of controlling mechanism which is shown in section. Fig. 2 is a section on the line 2—2 of Fig. 1. Fig. 3 is a section on the line 3—3 of Fig. 1. Fig. 4 is a plan view of a detail of the thermostatic mechanism employed in the construction of Figs. 1, 2 and 3, and Fig. 5 is an elevation partly in section showing a radiator and controlling mechanism differing somewhat from that shown in Figs. 1–4. Fig. 6 is a sectional plan on the line 6—6 of Fig. 5.
Fig. 7 is a perspective view of the adjusting key, and Fig. 8 is a plan of the expansible mechanism used in Fig. 5.

In the drawings and referring first to the construction shown in Figs. 1 to 4 inclusive, A represents a portion of a steam radiator of usual form provided at its upper end with the inlet passage B and at its lower end with the outlet passage C. The inlet B is in communication with the outlet chamber $D^1$ of the valve casing D. The outlet chamber $D^1$ and inlet chamber $D^2$ of the valve D are separated by the ported valve seat member $D^3$, which has a conical valve seat or port $D^4$ passing through it. The steam supply pipe (not shown) is connected to the chamber $D^2$ by the port $D^5$. The valve E controlling the port $D^4$ is hollow and is guided by a tubular member $D^6$ threaded into an opening formed in the lower wall of casing D. A valve operating rod $E^1$ threaded into and closing the passage in valve E at $E^2$ above the member $D^6$ passes down through the latter and through the bottom of valve casing D. A pin $D^7$ passing through a slot in the member $E^1$ prevents rotation of the rod $E^1$ relative to the valve casing. A spring $E^3$ normally urges the valve toward its seat. A rotatable key $D^8$ mounted in a cap $D^9$ inclosing the upper end of casing D, having a flattened lower end adapted to enter a slot or keyformed in the upper end of the valve E, serves as a means for rotating the valve on the threaded stem $E^1$ to adjust the valve. A coupling part F is secured to the radiator outlet C and forms the bottom of a chamber in which the thermostatic mechanism for operating valve E is located. The part F is open at its lower end to the escape conduit G, which may lead to the atmosphere or preferably in most cases to a pump or other pressure lowering device. At its upper end the part F is open to the interior of a tubular member H which forms the upper part of a chamber inclosing the thermostatic expansible mechanism. The member H has flanges $H^4$ at its ends, which abut against upper and lower bushings $H^1$ and $H^2$ respectively, formed of material such as compressed fiber compound having poor heat conductivity. The bushings $H^1$ and $H^2$ bear against the adjacent ends of the valve casing D and fittings F respectively and are clamped in place by collars $D^{10}$ and $F^4$ respectively. These collars are held out of heat transferring relation with the flanges $H^4$ by washers $H^3$ of the same material as the bushings $H^1$ and $H^2$. A tubular member J having an outturned flange $J^1$ adapted to bear against the under side of the bushing $H^2$ is centrally disposed within the member H and extends to a point adjacent the upper end of the latter. Within the tube J and connected to it at its upper end is the tube K and within the tube K and secured to it at its lower end is a tube L. The tube L has secured in its upper end a bushing $L^2$ of material of poor heat conductivity, like the bushings $H^1$ and $H^2$. To the bushing $L^2$ is secured the valve operating rod $E^1$, an enlargement $E^4$ formed at the lower end of which is embedded in the bushing. A bell shaped member $M^1$ is connected to the lower ends of the tubes L and K and has its lower end extending down below the top of the annular chamber $F^3$ formed in the bottom of the member F and surrounding an upwardly extending boss $F^1$, in which is formed the passage $F^2$ leading to the low pressure escape pipe G. A bushing N having ports $N^1$ adjacent its inner edge is secured to the under side of bushing $H^2$ and forms a guide for the tube K while at the same time it affords communication between the space between tubes K and J and the interior of fitting F. Ports $K^2$ and $L^1$ are formed in the upper end of parts K and J respectively so that the air admitted to the interior of tube H may pass into the upper end of the part L and thence to the escape conduit G and so that steam may pass from the outlet C of the radiator up through the space between J and K and thence through the ports $K^2$ and $L^1$ into the interior of the part L and from thence to the low pressure return pipe G. The passage of steam from the radiator outlet C directly into the escape pipe G through the port $F^2$ is impeded by a permanent water seal formed by the water of condensation in the annular recess $F^3$ into which the lower end of the bell shaped member $M^1$ extends, and from which the water of condensation is free to overflow into the return conduit. The parts J and L are formed of material having relatively high coefficients of thermal expansion, while the parts K and H are formed of material having a relatively low coefficient of thermal expansion. In consequence of this arrangement the expansible part of the thermostatic actuating mechanism is twice as long as each of the pipes L and J and the sensitiveness of the apparatus is correspondingly increased. Air is admitted to the interior of the tube H through port $H^6$ and pipe $P^1$ leading from the outlet port of valve casing P. The valve casing P is provided with two air inlets $P^2$ and $P^3$. The inlet $P^2$ receiving air from the atmosphere in the room warmed by the radiator, while the outlet port $P^3$ is connected with a source of air of differing temperature, preferably piping $P^4$ leads from the port $P^3$ to the exterior atmosphere. Within the valve casing P is a double-beat valve R which when moved down closes communication between $P^3$ and $P^1$ and when moved up closes communication between $P^2$ and $P^1$ and when in an intermediate position permits of a limited communication between $P^2$ and $P^3$ and $P^1$. The valve R is operated by the knurled knob $R^1$ journaled in the casing $P^6$ and in threaded engagement with the valve R. The valve R is prevented from rotating when the knob $R^1$ is rotated by engagement of the square portion $R^2$ of the valve with the casing guide $P^5$. Preferably the knob $R^1$ is provided with a pointer which engages with a dial on the cap $P^6$.

In practice the mechanism is preferably so set and arranged that with substantially equal quantities of air admitted to the interior of member H from ports $P^2$ and $P^3$ the valve E will be held by the thermostatic mechanism in position to permit just enough steam to flow into the radiator to maintain the desired temperature in the apartment. When so set any substantial variation either in the room temperature directly or in the temperature of the external atmosphere which of course ultimately affects the room temperature, causes a corresponding change in temperature of the thermostatic mechanism and in the degree of opening of the valve.

The mechanism should preferably be so adjusted that when the temperature of the air flowing into member H through port $H^6$ is the same as the desired apartment temperature, the valve E will close port $D^4$. It will be understood that the valve and thermostatic mechanism may be relatively adjusted by means of the threaded connection $E^2$ between the valve and the stem $E^1$. Ordinarily the thermostatic mechanism is so adjusted by means of key $D^9$ that the valve opens and closes automatically in response to temperature variations but the key $D^9$ and valve E may be used on occasions to manually and directly regulate the flow of steam into the radiator. Under ordinary circumstances the regulation should be such that all the steam admitted to the radiator is condensed therein. When as in extremely cold weather the radiator is operated at its maximum capacity, the valve E may be held open until steam enters the fitting F. Steam should then be shut off since a further admission of steam would not increase the heating capacity of the radiator but would result in steam waste. The mechanism described will effect this, since on account of the water seal in space $F^3$, the steam entering fitting F can pass to the escape conduit G only by passing through the by pass to the portion of the path of the water of condensation which includes the water seal in trough $F^3$. This by pass includes in the form shown the space between pipes J and K and the conduit formed by the hollow member L. This flow of steam along the thermostatic mechanism causes it to close valve E regardless of the temperature of the air admitted through port H⁵. At this instant the mechanism operates therefore as a thermostatic steam trap.

The mode of operation of the arrangement shown by Fig. 5 is much like that of the construction shown in Figs. 1 to 4 inclusive, but the mechanical arrangements differ in a number of respects. In the arrangement of Fig. 5 the inlet and outlet passages B and C of the radiator A are located at the bottom and at opposite ends of the radiator. The valve casing D is arranged between the inlet passage B and the steam supply pipe X as before, but the port $D^5$ to which the steam supply pipe leads, is located at the bottom of the casing and is directly controlled by the valve E, which is adapted to seat as before on a port $D^4$, but in this case the port $D^4$ is at the inner and upper end of the port $D^5$. In this construction the thermostatic mechanism is arranged above the casing D. The valve stem $E^1$ is attached at its upper end to the part L and is provided at its lower end with an enlargement $E^5$. The valve E bears against this enlargement and is secured in place by a nut $E^6$ which surrounds the stem $E^1$ and is threaded into a socket formed in the valve E and bears against the upper side of the enlargement $E^5$. The spring $E^8$ extends between the nut $E^6$ and the bushing H. In the form shown, the member $E^1$ is made of material of poor heat conductivity and slides in the sleeve $D^6$, which, in this case, is secured to the bushing $H^1$. At the upper end, the tubular member H is internally threaded to receive a bushing $H^6$ having ports $H^7$ through it and also to receive an externally threaded portion $S^1$ of a fitting S. The upper end of member J is secured in bushing $H^6$. The fitting S is provided with opposite disposed inlet passages $S^2$ and $S^3$, in which are fitted washers $S^4$ and $S^5$ respectively, which serve as abutments for springs $S^6$, which constantly tend to seat valves $T^1$ and $T^2$ respectively against valve seats $S^{14}$ and $S^{15}$ formed at the inner ends of the ports $S^2$ and $S^3$ respectively. The inner ends of the stems $T^1$ and $T^2$ bear against an eccentric $T^3$ carried on a hollow shaft $T^4$ which projects through the upper end of the fitting S and has secured to it an operating handle $T^{41}$. By rotating the handle $T^{41}$ the valves $T^1$ and $T^2$ may be adjusted. It will be observed that the arrangement is such that as the handle is rotated to permit one of the valves to close, the other is cammed in the opening direction. The key $D^9$ is mounted in the shaft $T^4$ and has its flattened lower end entering a kerf formed in the upper end of tube L. By means of this arrangement the tube L may be rotated in and axially adjusted with respect to a nut $L^1$ provided with wings $L^2$ which enter a kerf formed in the upper end of the tube K. By threading the tube L through the nut $L^1$ the action of the valve may be regulated. The fitting F at the outlet of the radiator differs from the fitting F of Fig. 1 in that bushing $H^2$ is replaced by a cap $F^4$, which has secured to its inner side a stem $M^2$ carrying a bell crank $M^3$, which has its lower edge projecting into the trough $F^3$ and which serves the same purpose in forming a water seal as does the bell M of Fig. 1. The fitting is also provided with a port $F^5$ leading from above the water seal which is formed in the trough $F^3$, and with a port $G^1$, which leads from the fitting at the head of the escape conduit G and below the water seal. A conduit V runs from the port $F^5$ to a T coupling $V^2$ which is connected to the port $S^2$ in the fitting S. The other branch of the coupling $V^2$ is connected to a conduit $V^1$ which may run to the external atmosphere. A conduit W runs from the port $G^1$ to a port $H^8$ leading through the wall of the member H adjacent its lower end.

The general operation of the apparatus shown in Fig. 5 is substantially identical in principle with the operation shown in Fig. 1. The water of condensation is free to flow from the port C into the escape conduit G through the water seal in trough $F^3$. The conduit V, fitting S, central passage in member L and the surrounding passages between members L and K, and between members K and J, lower end of chambered member H, port $H^7$, conduit W, and port $G^1$ form a by pass around the water seal through which steam, which may issue from the outlet end of the radiator, travels when the radiator is operated at its maximum capacity. The passage of steam through this by pass, of course, heats up the tubes L, K and J of the thermostatic mechanism and causes the valve to seat. In normal operation the temperature of the members L, K and J is regulated by the temperatures and proportions of the air passing into the fitting S through ports $S^2$ and $S^3$. Except when steam is issuing from the radiator outlet C, practically all of the air which enters the port $S^2$ comes from the external atmosphere through the conduit $V^1$.

Certain novel features of construction and arrangement shown and described, but not claimed herein, are claimed in the following Letters Patent: 893,339, granted July 14, 1908; 963,007, granted June 28, 1910; 988,726, granted April 4, 1911; 988,727, granted April 4, 1911.

While the constructions disclosed possess excellent mechanical and operating properties, it will be understood by those skilled in the art that changes may be made in the form of the apparatus disclosed without departing from the spirit of the invention, and I do not wish the claims hereinafter made to be limited to the particular forms shown more than is made necessary by the state of the art.

Having now described my invention, what I claim as new, and desire to secure by Letters Patent is:

1. In a steam heating system, the combination of a radiator having separate inlet and outlet passages, an escape conduit for conveying away from the radiator the steam and water of condensation escaping from the radiator through said outlet passage, a valve in said inlet passage and thermostatic mechanism for operating said valve comprising an expansible mechanism arranged out of the path of the water of condensation escaping from the radiator and means for causing steam issuing from said outlet passage to flow along a considerable extent of said expansible mechanism before entering said escape conduit.

2. In a steam heating system, the combination of a radiator having separate inlet and outlet passages, an escape conduit into which the water of condensation may pass from said outlet passage, means for impeding the flow of steam from said outlet passage directly into said escape conduit, a valve in said inlet passage and thermostatic actuating mechanism for the valve including means arranged to form a by pass connection between said outlet passage and escape conduit about said impeding means through which steam escaping from the radiator through said outlet passage passes to heat the thermostatic mechanism.

3. In a steam heating system, the combination of a radiator having separate inlet and outlet passages, an escape conduit into which the water of condensation may pass from said outlet passage, means for providing a water seal in the path of the water of condensation from the outlet passage of the radiator to said escape conduit, a valve in the inlet passage of the radiator and thermostatic actuating mechanism for the valve including expansible mechanism and means arranged to form a by pass connection between said outlet passage and escape conduit about said water seal through which steam issuing from the outlet passage of the radiator flows along said expansible mechanism.

4. In a steam heating system, the combination of a radiator having separate inlet and outlet passages, an escape conduit into which the water of condensation may pass from said outlet passage, means for providing a water seal in the path of the water of condensation from the outlet passage of the radiator to said escape conduit, a valve in the inlet passage of the radiator and thermostatic actuating mechanism for the valve including expansible mechanism and means arranged to form a by pass connection between said outlet passage and escape conduit about said water seal through which steam issuing from the outlet passage of the radiator flows along said expansible mechanism, and means for introducing air into said by pass.

5. In a steam heating system, the combination of a radiator having separate inlet and outlet passages, an escape conduit into which the water of condensation may pass from said outlet passage, means for providing a water seal in the path of the water of condensation from the outlet passage of the radiator to said escape conduit, a valve in the inlet passage of the radiator and thermostatic actuating mechanism for the valve, including expansible mechanism, and means arranged to form a by pass connection between said outlet passage and escape conduit, about said water seal through which steam issuing from the outlet passage of the radiator flows along said expansible mechanism, and means for introducing air of regulated temperature into said by pass.

6. In a steam heating system, the combination of a radiator having separate inlet and outlet passages, an escape conduit into which the water of condensation may pass from said outlet passage, means for providing a water seal in the path through which the water of condensation travels from the outlet passage of the radiator to said escape conduit, a valve in the inlet passage of the radiator, thermostatic mechanism for actuating the valve, comprising a casing, expansible mechanism located within the casing and connections from said casing to said outlet passage at one side of the water seal and to the escape conduit at the other side of the water seal.

7. In a steam heating system, the combination of a radiator having separate inlet and outlet passages, an escape conduit into which the water of condensation may pass from said outlet passage, means for providing a water seal in the path through which the water of condensation travels from the outlet passage of the radiator to said escape conduit, a valve in the inlet passage of the radiator, thermostatic mechanism for actuating the valve comprising a casing, expansible mechanism located within the casing and connections from said casing to said outlet passage at one side of the water seal and to the escape conduit at the other side of the water seal, and means for introducing air of regulated temperature into said casing.

HARRY C. MALLORY.

Witnesses:
WM. O. SHIPMAN,
G. B. ALDRICH.